United States Patent [19]

Tosh

[11] Patent Number: 4,520,185

[45] Date of Patent: May 28, 1985

[54] ALKANOLAMINE LINKED EPOXY-URETHANES

[75] Inventor: Douglas J. Tosh, Brantford, Canada

[73] Assignee: Sternson Limited, Brantford, Canada

[21] Appl. No.: 646,702

[22] Filed: Aug. 31, 1984

[51] Int. Cl.$^3$ .............................................. C08G 18/32
[52] U.S. Cl. ........................................ 528/65; 528/73
[58] Field of Search .................................... 528/65, 73

[56] References Cited

U.S. PATENT DOCUMENTS

| | | | |
|---|---|---|---|
| 2,830,038 | 4/1958 | Pattison | 528/60 |
| 3,020,262 | 2/1962 | Speranza | 260/47 |
| 3,445,436 | 5/1969 | Lake et al. | 528/60 |
| 3,525,779 | 8/1970 | Hawkins | 528/60 |
| 3,763,079 | 10/1973 | Fryd | 528/83 |
| 3,931,116 | 1/1976 | Bernstein et al. | 525/438 |
| 4,111,917 | 9/1978 | Larsen | 528/45 |
| 4,143,009 | 3/1979 | Dewey | 521/178 |
| 4,267,288 | 5/1981 | Burkhart | 525/438 |
| 4,282,123 | 8/1981 | Ilaria | 428/425.8 |

FOREIGN PATENT DOCUMENTS 672467 10/1963 Canada .

*Primary Examiner*—Maurice J. Welsh
*Attorney, Agent, or Firm*—Barrigar & Oyen

[57] ABSTRACT

Novel epoxy-urethane resins are produced by the reaction of an epoxy-alkanolamine adduct and a urethane prepolymer. The epoxy-alkanolamine adduct is prepared by reacting a liquid resin with an N-substituted ethanolamine such as isopropyl ethanolamine and tertiary butyl ethanolamine. The epoxy-urethane resin can be cured using ordinary epoxy curing agents for application as waterproofing membranes, joint sealants and adhesives. Two-part resin systems comprising epoxy-urethane resins of the invention as the first part and an appropriate curing agent as the second part avoid disadvantages characteristic of resin mixtures that rely on urethane cure chemistry.

16 Claims, No Drawings

ALKANOLAMINE LINKED EPOXY-URETHANES

FIELD OF THE INVENTION

The present invention relates to epoxy-urethane copolymeric materials and methods of producing same by reacting epoxy resins with isopropyl and tertiary butyl alkanolamines to produce an epoxy-alkanolamine adduct which is then reacted with urethane prepolymers to produce a stable product that can be cured using conventional curatives effective in the curing of epoxy resins.

BACKGROUND OF THE INVENTION

Epoxy-urethane polymeric compositions are known to possess physical properties which make them useful in applications such as elastomers, sealants and adhesives. Conventional epoxy resins such as those made by condensing epichlorohydrin with bisphenol A are readily and controllably cured by many types of materials to make products which exhibit high strength, but which are generally unsuitable for applications for which flexibility and elasticity are required.

By contrast, useful elastomeric materials can be made by the curing of urethane prepolymers (typically formed through the reaction of a diisocyanate and a glycol), using glycols, amino alcohols or diamines as vulcanizing agents. However, urethane-based resin compositions are known to present a number of practical problems, particularly in on-site mixed applications, stemming from the sensitivity of their cure chemistry to the presence of moisture and to the mix ratio. Typically, the use of urethane-based resin compositions as grouts, sealants or waterproofing membranes requires the on-site mixture of a resin component and a curative component in a specified mix ratio. Any departure from this mix ratio, which can readily occur by oversight or through the use of such two-component systems by unskilled persons, leads to unsatisfactory curing and inadequate physical properties of the cured resin.

A number of attempts have been made to produce resin-curative systems which exhibit at once the best features of both expoxies and urethanes. A curable liquid polyurethanepolyepoxide is described in U.S. Pat. No. 2,830,038 (Pattison). That material is prepared by reacting a polyurethane prepolymer with a hydroxy aliphatic epoxide compound such as glycidol. The resultant epoxide-terminated urethane prepolymer is then cured by mixing with polyamine compounds and heating for several hours at elevated temperatures.

U.S. Pat. No. 3,445,436 (Lake) similarly describes a sealant composition comprising a polyurethane prepolymer in which isocyanate groups are replaced by epoxy groups by reaction of a polyurethane prepolymer with hydroxy aliphatic epoxide compounds, or compounds containing an active hydrogen and aliphatic unsaturation capable of undergoing epoxidation in situ.

Significant disadvantages presented by the preparation of the aforementioned known epoxy-urethanes stem from the high cost and relative instability of glycidol and of the related reactants employed to replace the isocyanate functionality of a urethane prepolymer with epoxide.

U.S. Pat. No. 4,143,009 (Dewey) describes a two-component composition for preparing an epoxy-urethane resin, in which the first component is a mixture of an organic diepoxide and a hydroxyalkyl tertiary amine and the second part is an organic diisocyanate. The presence of free isocyanate groups in one of the resin components renders this composition subject to the disadvantages of urethane systems, principally susceptibility to moisture.

U.S. Pat. No. 3,445,436 (Burkhart) describes adhesive compositions formed by capping the polyester-urethanes described in U.S. Pat. No. 3,763,079 (Fryd) with a dicarboxylic acid anhydride and chain-extending the capped polyester-urethane with an epoxy resin. The end products of this reaction are solids and must be dissolved in an appropriate organic solvent for use as adhesive compositions. Cross-linking (curing) of the dissolved epoxy-urethanes described by Burkhart is effected through available hydroxyl groups on the chain, using polyisocyanates or amino-formaldehyde resins, such as melamine-formaldehyde. It does not appear that curing of these epoxy-urethanes can usefully be effected through the epoxide functions of the chain, in contrast to the epoxy-urethanes of the present invention. The ability to use conventional epoxy curing agents is a substantial advantage of the novel epoxy-urethanes described and claimed herein, owing to the relative controllability and lower moisture sensitivity of the epoxy cure chemistry compared to that of isocyanates.

SUMMARY OF THE INVENTION

It has now been found that an epoxy-urethane resin, of block structure epoxy-urethane-epoxy, and having no free isocyanate groups, can be prepared using an appropriate alkanolamine as a linking molecule between the urethane and the epoxy. The resins of the invention require only a two-stage reaction for their preparation, using readily available reagents and simple reaction conditions. The resin has good shelf stability and can be compounded, then cured using conventional epoxy curing agents to form a wide variety of products useful in applications such as waterproofing membranes, joint sealants and adhesives, in lieu of conventional polysulphide, polyurethane or flexibilized epoxies. Unlike conventional two-component urethane resin systems, the epoxy-urethane resin of the present invention obviates the necessity for very accurate mixing ratios between the resin and curative components. Further, the resins of the present invention have excellent adhesion to a range of substrates, without priming, and have a cure chemistry which can tolerate low temperature and high humidity, permitting the use of the epoxy-urethanes of this invention under a wide range of environmental conditions.

DETAILED DESCRIPTION OF THE INVENTION

The epoxy resins useful for the purposes of this invention are those compounds containing two or more reactive epoxy groups per molecule. In particular, the class of epichlorohydrin-bisphenol A resins such as those sold under the trade mark Epon may be used. Preferred for use in this invention are the liquid resins Epon 828 and Epon 813, each having an epoxide equivalent weight of approximately 190 g, and mixtures thereof. The expoxide equivalent weight (EEW) is defined as the weight of material, in grams, containing one gram equivalent of epoxide groups. Epon 828 is a diglycidyl ether of bisphenol A and Epon 813 contains a similar epoxy compound but in addition a small amount of butyl glycidyl ether, which acts as a reactive diluent to reduce the viscosity of the resin.

In certain cases it has been found useful in obtaining a liquid epoxy-alkanolamine adduct of sufficiently low viscosity to admix with the epoxy resin component a lower molecular weight di-epoxide such as 1, 4-butanediol diglycidyl ether.

The urethane prepolymers useful for the purposes of this invention include low molecular weight, isocyanate-terminated liquid or low-melting polyurethanes having at least two isocyanate groups, such as, for example, the reaction products of glycol polyethers or glycol polyesters with aromatic di-isocyanates. Examples are well known in the art, such as those sold under the trade mark Vibrathane by Uniroyal. The following table indicates characteristics of Vibrathane series urethane prepolymers that have been found useful for this invention.

| URETHANE PREPOLYMER | COMPOSITION | AMINE EQUIVALENT WEIGHT |
|---|---|---|
| Vibrathane B670 | Polyether-MDI* | 380 g |
| Vibrathane B600 | Polyether-TDI* | 1010 g |
| Vibrathane B625 | Polyether-MDI | 650 g |
| Vibrathane 6020 | Polyester-MDI | 614 g |
| Vibrathane 809 | Polyether-MDI | 1025 g |
| Vibrathane 6004 | Polyester-TDI | 1000 g |
| Vibrathane 6008 | Polyester-TDI | 1350 g |
| Vibrathane B602 | Polyether-TDI | 1330 g |
| Vibrathane 8021 | Polyester-MDI | 620 g |

*MDI has the structure

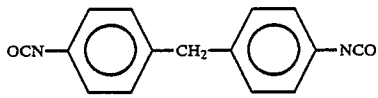

TDI has the structure

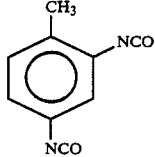

The amine equivalent weight of the isocyanate-containing urethanes, defined as the number of grams of isocyanate which is consumed by one gram mole of a secondary amine, is a direct measure of the isocyanate equivalent weight and provides a measure of the isocyanate functionality of the urethane prepolymer. These isocyanate groups are available for reaction with the hydroxyl groups of the alkanolamine molecule to link the epoxy-alkanolamine adduct to a urethane prepolymer, according to the method of the invention.

EPOXY-ALKANOLAMINE ADDUCTS

It has been found that di- and polyfunctional epoxy resins can be reacted with isopropyl ethanolamine or tertiary butyl ethanolamine, to produce a product which is substantially stable for a period from a few hours to a few days (depending on the nature of the epoxy resin), if an excess of resin-derived epoxide over the secondary amine from the substituted ethanolamine is used in the reaction.

The epoxy-alkanolamine adduct has free hydroxyl groups derived from the alkanolamine component of the adduct and can subsequently react through these with the terminal isocyanate groups of a urethane prepolymer to form the epoxyurethane polymers of the invention. The applicant does not wish to be bound by a specific theory as to the reaction scheme by which the polymers of its invention are produced, but it would appear that the principal reaction between an epoxiderminated linear epoxy resin (component A) and N-isopropyl ethanolamine (IPEA) to produce a typical epoxy-alkanolamine adduct (component B) is as follows:

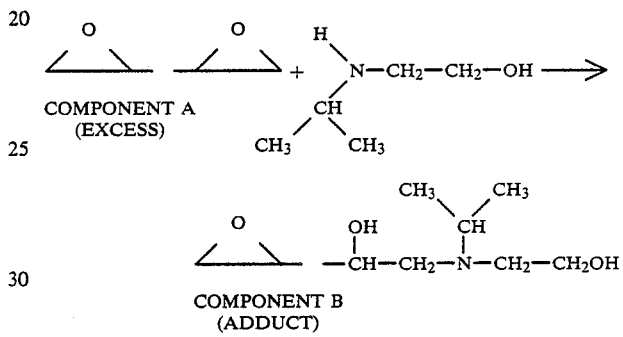

To produce epoxy-urethane-epoxy copolymers of the kind represented by component D, illustrated below, adduct B can then be reacted with an isocyanate-terminated urethane prepolymer (component C, below). In the following representative reaction scheme, component C is a generalized isocyanate-terminated linear urethane prepolymer, reacted with the epoxy-alkanolamine adduct to the extent of 1:1 equivalents (hydroxyl) of the adduct to equivalents (isocyanate) of the prepolymer:

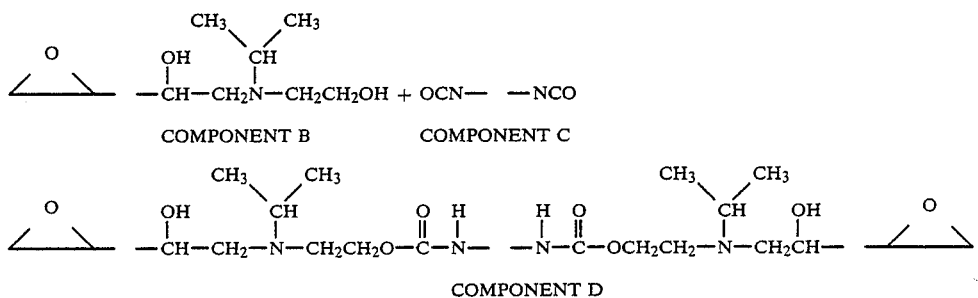

Epoxy-urethane resins of the invention, as illustrated by D can be used alone or compounded with diluents, fillers and plasticizers as one component of a two-component resin system, the second being any suitable epoxy curing agent. Among the advantages of the epoxy-urethane resins according to the present invention is the absence of any residual isocyanate groups.

Substituted alkanolamines having primary amino groups and secondary alkanolamines having less bulky alkyl substituents than isopropyl or tertiary butyl were found to be unsatisfactory in the preparation of epoxyalkanolamine adducts, presumably because of the relatively greater reactivity of the amino nitrogen therein as an epoxy curative. This greater reactivity is believed to result in premature curing of the free epoxide groups in the adducts. By way of illustration, it was found that methyl ethanolamine, which has a less hindered secondary amino hydrogen than IPEA, reacted rapidly with excess epoxy resin, evolving considerable heat with the rapid production of a solid mass, rather than the liquid adducts obtained with IPEA and tertiary butyl ethanolamine (TBEA). This suggests that the tertiary nitrogen initially produced by the reaction of an epoxy resin with methyl ethanolamine is unduly reactive with the excess epoxy groups of the adduct, owing to its relatively low steric hindrance.

REACTION CONDITIONS

All reactions were carried out under nitrogen. Small scale reactions (50–100 g) were carried out in metal cans with spatula stiring. Larger scale reactions (200–1500 g) were carried out in one L or two L resin reaction kettles using an air driven stirrer.

In the first stage of the reaction scheme, a suitable epoxy resin is reacted with IPEA or TBEA. A ratio of 3.5 epoxide equivalents to one amine equivalent is preferred to ensure the retention of active epoxy functions on the adduct, but other ratios can be used as long as excess epoxide is present.

In order to initiate the reaction between the epoxy resin and the alkanolamine, heating of the mixture to a temperature above 65° C. is required. Once induced, however, the reaction between resin and alkanolamine is exothermic and self-sustaining. Where IPEA is used as the alkanolamine component, the temperature must be maintained below about 110° C. to avoid loss of IPEA by vaporization. In practice, in the reation between an appropriate epoxy resin and IPEA, external heating of the reaction mixture is stopped at a temperature of about 90° C. and is maintained at that level, during the course of formation of the adduct, by the heat evolved in the exothermic reaction.

It has been found that IPEA or TBEA adducts with epoxy resins stop reacting at the adduct stage and are stable for several weeks at ambient temperature before reacting further and solidifying, presumably by curing of the residual epoxy functions catalysed by the tertiary amino nitrogen derived from the adducted IPEA or TBEA. Since the epoxyalkanolamine adduct is an intermediate intended for use in reaction with urethane prepolymers to produce the curable epoxy-urethanes of this invention, and in practice would be kept at most for one or two days, the long term instability of the epoxy-alkanolamine adduct is not of concern.

The progress of the reaction between epoxy resin and alkanolamines has been followed by sampling the mixture at selected times and conducting an epoxide equivalent weight analysis of the samples taken. Briefly, the analytical method used involves reacting the epoxy groups with hydrogen bromide generated in situ. Excess HBr is determined by an indicator colour change. The method is substantially that described in test method bulletin, entitled "Determination of 1, 2-epoxy groups in Epikote Resins and Cardura E-10", appearing in the Epikote Technical Manual EP1.5.2 Second Edition (Shell Chemicals).

Qualitatively, the reaction pattern between epoxy resins and IPEA and TBEA appears to exhibit a fairly consistent pattern, the epoxide equivalent weight of the epoxy/alkanolamine mixture starting at an initial level and rising over time to a plateau where it holds steady at the reaction temperature for several hours before commencing a slow increase, where further reactions of the epoxy-alkanolamine adduct occur. It is in this plateau region that the adduct is reacted with urethane prepolymer to form the epoxy-urethanes of the invention.

By way of example, it has been found that a mixture of 100 grams of Epon 828 with 16 grams of IPEA, reacted at a temperature of 90°–100° C., resulted in a measured epoxide equivalent weight of 178 after fourteen minutes of reaction. After ninety-one minutes the epoxide equivalent weight of the adduct was 218, and after one hundred and ninety-six minutes was 220. Further heating of this adduct for one hour at 140° C. was found to produce a measured epoxide equivalent weight of 223, illustrating the short term stability of the epoxy-alkanolamine adduct.

In the second stage of the reaction, the epoxy-alkanolamine adduct is mixed with a quantity of urethane prepolymer, having a known or measured isocyanate functionality, in a ratio such that the number of hydroxyl equivalents provided by the adducted alkanolamine is approximately equal to or, preferably, greater than the number of isocyanate equivalents derived from the urethane prepolymer, so that substantially no residual isocyanate groups remain in the reaction product. The level of free isocyanate can be monitored by infrared spectrometry, using the strong characteristic absorption peak at $2260\ cm^{-1}$, which disappears with time over the course of the adduct/isocyanate reaction.

The final reaction product is an epoxy-urethane polymer which can be cured at room temperature, using standard epoxy curatives such as suitable aliphatic or aromatic amines, amido amines and polyamides. As will be illustrated in some of the examples which follow, compositions with useful properties may be obtained by compounding the epoxy-urethane of the present invention with plasticizers and/or fillers prior to curing.

PHYSICAL TESTING OF THE CURED RESINS

The epoxy urethanes and curative agents were mixed by spatula in metal cans. When pot life permitted, degassing under vacuum was carried out, then a sheet was poured onto Teflon, or Teflon-sprayed glass. After a room temperature cure, most samples were tested after seven days for tensile strength elongation to break (ASTM D412), Die C tear (ASTM D624) and after six days for Shore D hardness (ASTM D2240). Shore D hardness was also tested after twenty-eight days at room temperature.

The invention will be further understood by consideration of the following examples, which are provided by way of illustration:

EXAMPLE 1

48 grams of Epon 828 epoxide equivalent weight 190) was reacted with 7.5 grams of IPEA (amine equivalent weight=hydroxyl equivalent weight=103) to form the epoxy-ethanolamine adduct. The adduct was reacted to completion with 100 grams of Vibrathane B602 (amine equivalent weight 1360). 4.4 grams of TETA was added as curative and the mixture cured at room temperature. The resulting product had a tensile strength of 550 psi, a percent elongation to break of 95%, a Die C tear of 75 pli and a Shore D hardness of 31.

EXAMPLE 2

The same reaction conditions for preparing the adduct, reacting the adduct with urethane prepolymer, and curing the epoxy-urethane resin were used as in the case of Example 1 above. The reaction components were 100 grams of Vibrathane 6008 (amine equivalent weight 1300), 50 grams of Epon 828 and 7.8 grams of IPEA. 3.9 grams TETA were added as curative. After curing at room temperature the product had a tensile strength of 440 psi, an elongation to break of 120%, a Die C tear of 82 pli and a Shore D hardness of 22.

EXAMPLE 3

Under the same reaction conditions as Example 1, an epoxy-alkandamine adduct was prepared by the reaction of 165 grams of Epon 828 with 26 grams of IPEA. The resulting adduct was reacted with 100 grams of Vibrathane B670 (amine equivalent weight 380). 14.8 grams of TETA was added as curative. After at room temperature curing, the product exhibited a tensile strength of 6000 psi, a percent elongation to break of 7% and a Shore D hardness of 80.

Examples 1, 2 and 3 illustrate the effect of varying the urethane prepolymer type on the final properties of the cured resin. As a general rule, it appears that the lower the isocyanate content of the urethane prepolymer reacted with the epoxy-alkanolamine adduct, the more flexible and rubbery the end product.

EXAMPLE 4

Similar reaction and curing conditions were used as in Example 1 and, as in that case, 100 grams of Vibrathane B602 was used as the urethane prepolymer. The epoxy-alkanolamine adduct was prepared by the reaction of 74 grams of Epon 828 with 10.2 grams of IPEA and the reaction product of the adduct with the urethane prepolymer was mixed with 5.8 grams of TETA and the entirety cured at room temperature. The resultant product had a tensile strength of 1500 psi, an elongation to break of 75%, a Die C tear of 230 pli and a Shore D hardness of 46.

Examples 1 and 4 taken together illustrate the influence on the final properties of the cured resin of the ratio of urethane to epoxy employed. The preferred ratio is 100 parts urethane prepolymer to 50 parts epoxy, but materials with up to 165 parts epoxy to 100 parts urethane have been made.

EXAMPLE 5

Using the reaction conditions of the previous examples, 100 grams of Vibrathane 6008 was reacted with an epoxy-alkanolamine adduct formed by the reaction of 31 grams of Epon 813 (epoxide equivalent weight=190 g.) with 8 grams of IPEA. 9 grams of TETA were added, and after curing at room temperature the resultant product exhibited a tensile strength of 90 psi, a percent elongation to break of 375% and a Shore D hardness of 7.

Examples 1 to 5 above illustrate the wide range of physical properties obtainable through the use of epoxy-urethane resins of the invention. The formulation of Example 5 produces a resin useful as a joint sealant. The properties of the resins prepared according to the formulations of Examples 3 or Example 6, below, suggest their usefulness in applications as structural adhesives.

EXAMPLE 6

100 grams of Vibrathane 6008 was reacted with an epoxy-alkanolamine adduct formed by the reaction of 75 grams of Epon 828 with 8 grams of TBEA (amine equivalent weight=hydroxyl equivalent weight=117 g). 9 grams of TETA were added and the mixture cured at room temperature. The resultant product had a tensile strength of 1580 psi, an elongation to break of 80%, a Die C tear of 262 pli and a Shore D hardness of 52.

EXAMPLE 7

This example demonstrates the production of a lower viscosity epoxy-urethane. The batch was produced in a one litre glass reaction kettle equipped with a variable speed stirrer. The reaction components used were as follows:

Epon 828:375 g
IPEA: 56 g
Vibrathane 6008:680 g
Araldite RD-1:75 g

Araldite RD-1, obtained from Ciba-Geigy, is a mono-epoxy reactive modifier, having an epoxy equivalent weight of 140 g, and acts as a diluent in the system.

300 grams of the Epon 828 and the IPEA were first reacted for two hours at 70°–90° C. The Vibrathane 6008 was added over 100 minutes at 70°–95° C. Finally, 75 g Epon 828 and 25 g RD-1 were added. The complete reaction required five hours. A sample was cured with TETA (30 grams of the epoxy-urethane reaction product to 1 gram of TETA) at room temperature. Overnight, the material had cured to a tough rubbery sheet. By contrast, as sample of the above epoxy-urethane formulation without added curative was placed in a 70° C. oven and showed no change overnight. The uncured material did not exhibit any substantial change in properties after more than one year at room temperature.

EXAMPLE 8

Plant Batch of Epoxy-Urethane Resin

The plant batch was made in a 45 gallon capacity Hockmeyer mixer equipped with heating, cooling and vacuum.

The reaction was carried out in two stages. Stage 1 was the reaction between 43.8 kg of Epon 828 and 6.8 kg of IPEA (added in two increments). These components were reacted for two hours at 70°–90° C. Epoxide equivalent weight analysis after 85 minutes of reaction was 219 and at 116 minutes was 217.

Stage 2 was the reaction between the epoxy-IPEA adduct and the urethane prepolymer, 45.5 kg of Vibrathane B602 (kept liquid at 30° C. and added in four increments). The adduct/prepolymer mixture was heated for three hours at 70°–90° C. The reaction mixture was degassed under vacuum for the last hour of reaction. Samples were cured with TETA at room temperature and subsequently subjected to physical tests. The cured samples of the plant batch exhibited tensile strengths lying in the range 530–565 psi, an elongation at break of 70%, a Die C tear of 82–92 pli and a Shore D hardness of 28–31. The resin was found to have excellent adhesion to unprimed glass, concrete, steel and plastics.

EXAMPLE 9

This example illustrates the use of plasticizers and additives in the compounding of epoxy-urethanes according to the present invention. In particular, it relates to the production of a two-component membrane system, using the resin produced in Example 8, which may be used to make a waterproofing membrane. The epoxy-urethane resin of the present invention, consisting of an epoxy linked to a urethane through an alkanolamine, is particularly advantageous in this application because of the relative insensitivity of the two-component system of resin and curing agent to mixing ratio and to the presence of moisture, as well as the excellent adhesion of the resin to unprimed surfaces.

The material of this example was prepared in a five gallon pail using a variable speed Bowers type of mixer. 4.26 kg of the epoxy-urethane resin batch was melted and added to 3.78 kg of coal tar CP 24 (Currie Products). These were mixed for 15 minutes and then 1.28 kg of Zeospheres 0/45 (Stochem) were added in three increments and dispersed for 30 minutes. The mixture was allowed to cool to 35° C. whereupon 0.85 kg of pine oil (Dertol 90) was added. The measured Brookfield viscosity at 20° C. was 435,000 cps. 0.68 kg of Cellosolve acetate was added to give a viscosity of 60,000-80,000 cps at 20° C. The compounded epoxy-urethane resin was cured by mixing in 5 phr of 2,4,6-tri (dimethylaminomethyl) phenol (DMP-30, Rohm and Haas) and 1.5 phr Ancamine MCA (Shell Chemicals). This product has excellent properties for application as an elastomeric waterproofing membrane, meeting the standard specification for such materials set out in ASTM specification C 836-81. The product had a work life of two hours, a walk-on time of 24 hours and the following physical properties:

Maximum tensile strength: 550 psi
Elongation: 320%
Shore D hardness: 20
Die C tear: 120 pli A large number of other compositions were made, cured and tested from the plant batch of Example 8 above. It will be understood that the levels of filler and/or plasticizer to be employed in the compounding of epoxy-urethanes of the present invention will depend in large part upon the specific end use contemplated.

It has been found that the particular choice of curing agent has a more significant effect on the final properties of the product than the choice of filler or plasticizers. Cured epoxy-urethane resins exhibiting a combination of good elongation to break plus high tensile strength and tear resistance can be obtained by curing the plant batch formulation of Example 8 with Ancamine LO, DMP-30 or mixtures thereof.

There has been in the past some market resistance to two-component urethane membrane systems because of the necessity for very accurate resin/curative mixtures and the problem of moisture-sensitivity of the isocyanate-containing urethane. It has been found that for epoxy-urethane resins of the present invention, a deviation from the stoichiometric amounng of curing agent of up to 30% results in relatively small changes in the physical properties of the cured polymer by comparison with previous two-component urethane membrane systems.

The examples given above are illustrative of the properties of epoxy-urethane polymers and compounds thereof according to the present invention. Modifications which do not depart from the spirit of the invention will be apparent to those skilled in the art, and the scope of the invention is thus to be defined solely by the scope of the appended claims.

What is claimed is:

1. An epoxy-urethane curable with an epoxy curing agent, comprising the reaction product of
   (a) an epoxy-alkanolamine adduct prepared by reacting
      (i) a liquid epoxy resin comprising an epoxy compound having two or more reactive epoxy groups, with
      (ii) an N-substituted ethanolamine selected from the group consisting of isopropyl ethanolamine and teritiary butyl ethanolamine
   in a ratio providing an excess of epoxide equivalents from the epoxy resin over amine equivalents of the ethanolamine, and
   (b) a urethane prepolymer of the kind formed by the condensation of low molecular weight, hydroxyl-terminated alkyl polyesters or polyethers with an aromatic di-isocyanate to produce a liquid, isocyanate-terminated polyurethane prepolymer,
the relative quantities of said urethane prepolymer and of said epoxy-alkanolamine adduct reacted together being such that the number of hydroxyl equivalenets from said ethanolamine is approximately equal to or greater than the number of isocyanate equivalents from said urethane prepolymer, so that substantially no residual isocyanate functionality remains in the reaction product.

2. An epoxy-urethane according to claim 1, wherein the ratio of said liquid epoxy resin to said N-substituted ethanolamine lies in the range of about 2.0 to about 10.0.

3. An epoxy-urethane according to claim 2, wherein said liquid epoxy resin is selected from the group consisting of Epon 828 and Epon 813 or mixtures thereof, and wherein said urethane prepolymer is selected from the group consisting of Vibrathane B600, Vibrathane B602, Vibrathane B625, Vibrathane B670, Vibrathane 809, Vibrathane 6004, Vibrathane 6009, Vibrathane 6020, Vibrathane 8021 or mixtures thereof.

4. An epoxy-urethane according to claim 1, claim 2, or claim 3, further comprising an inert filler.

5. An epoxy-urethane according to claim 1, claim 2, or claim 3, further comprising a non-reactive plasticizer.

6. An epoxy-urethane curable with an epoxy curing agent, comprising the reaction product of
   (a) an epoxy-urethane adduct prepared by reacting Epon 828 with a quantity of isopropyl ethanolamine in relative quantities such that the epoxide equivalents from the Epon 828 exceed the amine equivalents from the isopropyl ethanolamine by a ratio lying in the range of about 2.0 to 10.0, and
   (b) a quantity of Vibrathane B602 such that the ratio of hydroxyl equivalents from the isopropyl ethanolamine to the isocyanate equivalents from the Vibrathane B602 is approximately equal to or greater than 1.

7. An epoxy-urethane according to claim 6, further comprising a inert filler.

8. An epoxy-urethane according to claim 6 or claim 7, further comprising a non-reactive plasticizer.

9. A process for making an epoxy-urethane curable with an epoxy curing agent, comprising the steps of:
   (a) reacting a liquid epoxy resin having an epoxide functionality of two or greater with an N-substituted ethanolamine selected from the group consisting of isopropyl ethanolamine and tertiary butyl ethanolamine in proportions such that epoxide equivalents on said epoxy resin are in excess of the amine equivalents on said ethanolamine, (b) monitoring the epoxide equivalent weight of the reaction mixture of step (a) as it increases to a level which is substantially constant for at least one-half hour, (c) adding to the reaction mixture a quantity of liquid, isocyanate-terminated polyurethane prepolymer such that the amine equivalents on said ethanolamine are approximately equal to or exceed the isocyanate equivalents on said polyurethane prepolymer, to produce an epoxy-urethane substantially free of isocyanate functionality.

10. A process according to claim 9, wherein the relative proportions of said liquid epoxy resin and said N-substituted ethanolamine are selected so that the epoxide equivalents on said epoxy resin exceed the amine equivalent on said ethanolamine by a ratio lying in the range of about 2.0 to 10.0.

11. A process according to claim 9 or claim 10, further comrising the step of adding an inert filler to the reaction mixture.

12. A process according to claim 9 or claim 10, further comprising the step of adding a non-reactive plasticizer to the reaction mixture.

13. A process for preparing an epoxy-urethane polymeric material, comprising the steps of (a) reacting a liquid epoxy resin having an epoxide functionality of two or greater with an N-substituted ethanolamine selected from the group consisting of isopropyl ethanolamine and tertiary butyl ethanolamine in proportions such that the epoxide equivalents on said epoxy resin are in excess of the amine equivalents on said N-substituted ethanolamine, (b) monitoring the epoxide equivalent weight of the reaction mixture of step (a) as it increases to a level which is substantially constant for at least one-half hour, (c) adding to the reaction mixture a quantity of liquid, isocyanate-terminated polyurethane prepolymer such that the amine equivalents on said ethanolamine are approximately equal to or exceed the isocyanate equivalents on said polyurethane prepolymer, to produce a first part consisting essentially of an epoxy-urethane substantially free of isocyanate functionality, (d) determining the epoxide equivalent weight of said first part, (e) providing a second part comprising approximately one amine equivalent per epoxide equivalent of said first part of an epoxy curing agent, (f) mixing said first and second parts to provide a curable composition, and (g) allowing said curable composition to cure.

14. A process according to claim 13, wherein said proportions of liquid epoxy resin and N-substituted ethanolamine are chosen so that the ratio of epoxide equivalents on said epoxy resin to amine equivalents on said N-substituted ethanolamine lies in the range of about 2.0 to 10.0.

15. A process according to claim 13 or 14, further comprising the step of adding an inert filler to said first part.

16. A process according to claim 13 or claim 14, further comprising the step of adding a non-reactive plasticizer to said first part.

* * * * *